United States Patent [19]
Frutschi

[11] 4,193,266
[45] Mar. 18, 1980

[54] GAS TURBINE POWER PLANT

[75] Inventor: Hansulrich Frutschi, Riniken, Switzerland

[73] Assignee: BBC Brown Boveri & Company Limited, Baden, Switzerland

[21] Appl. No.: 926,199

[22] Filed: Jul. 19, 1978

[30] Foreign Application Priority Data

Jul. 28, 1977 [CH] Switzerland .......................... 9326/77

[51] Int. Cl.² .............................................. F02C 1/04
[52] U.S. Cl. ........................................ 60/644; 60/650; 60/684
[58] Field of Search .................. 60/644, 650, 682, 684, 60/715

[56] References Cited
U.S. PATENT DOCUMENTS

| | | | |
|---|---|---|---|
| 3,579,982 | 5/1971 | Strub | 60/644 |
| 3,715,887 | 2/1973 | Weatherly et al. | 60/650 |

Primary Examiner—Allen M. Ostrager
Attorney, Agent, or Firm—Burns, Doane, Swecker & Mathis

[57] ABSTRACT

A gas turbine power plant has a gas turbine including both high-pressure and low-pressure turbine sections and a compressor including both high-pressure and low-pressure compressor sections. One gas turbine section and one compressor section are arranged on each of a pair of twin-shafts with a closed circulation system flowing through the compressor and gas turbine sections. A nuclear reactor supplies heat to a working gas of the circulation system. Various by-passes for the working gas are provided which are controlled in response to operating conditions. In this way, the pressure of the working gas within the nuclear reactor and between the low and high pressure gas turbine sections is maintained substantially constant.

18 Claims, 1 Drawing Figure

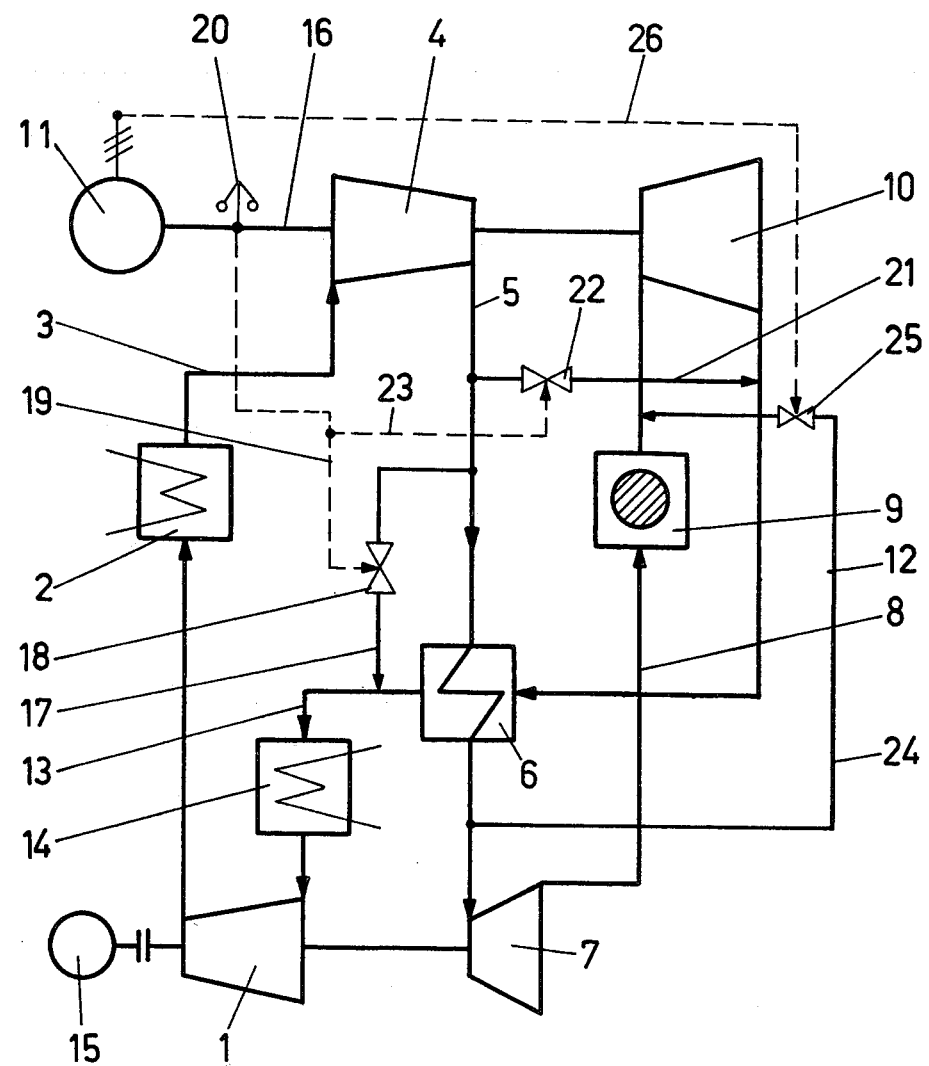

GAS TURBINE POWER PLANT

BACKGROUND OF THE INVENTION

The present invention relates generally to a gas turbine power plant having twin-shafts and provided with a closed circulation system for a working gas. A nuclear reactor, which is gas-cooled and that operates by a once-through flow serves as the source of heat for the working gas. The gas turbine power plant includes a compressor as well as gas turbine, each of which have one high-pressure section and one lower-pressure section. Each compressor section and each gas turbine section are located on a common shaft. At least one current generator is provided which is driven by one of the gas turbine sections.

A power plant of this type, in which the low-pressure sections of the compressor and the gas turbine are arranged on one shaft, and the high-pressure sections of the compressor and the gas turbine are arranged on the other shaft, leads to engineering problems in connection with a control of speed of the compressor and turbine if the source of heat is a gas-cooled nuclear reactor with a once-through flow operation. In the event of rapid changes in operating conditions, for example should a load cutoff occur, the reactor would be subjected to wide fluctuations in pressure which could destroy the reactor.

A power plant is known in which a high-pressure and a low-pressure section of a compressor as well as a gas turbine are combined together and are all arranged, together with a current generator, on a single shaft. A nuclear reactor, which serves as the source of heat is placed between the two gas turbine sections. Such as plant does not necessarily result in any operational problems but the plant can not be designed so that it will operate at maximum efficiency. Furthermore, the long machine unit requires several shaft bearings and complicated pipe connections and is particularly unsuitable for use within a preloaded concrete pressure vessle.

A cross-compound arrangement is also known for a powerplant wherein a low-pressure section of a gas turbine drives both a high-pressure section of a compressor as well as a current generator. A high-pressure section of the gas turbine drives a low-pressure section of the compressor. The known power plant designed in this manner is relatively complicated and does not offer any particularly significant operational advantages in comparison with a standard arrangement having twin-shafts.

Accordingly, it is an object of the present invention to provide a gas turbine power plant having twin-shafts with a gas-cooled nuclear reactor operating by a once-through flow of a working gas as the source of heat which will react properly under both stable as well as transient operating conditions. Such a power plant has satisfactory engineering characteristics with respect to regulating behavior, with any danger to the reactor resulting from pressure fluctuations within the working gas being eliminated.

The present invention satisfies this and other objects in that the power plant is arranged in the form of a cross-compound system. The reactor is provided between the high-pressure section and the low-pressure section of the gas turbine. The power plant is accordingly arranged so that a mean working gas pressure between the two turbine sections, and consequently the pressure within the reactor, will be at least substantially constant at full load, no-load as well as standstill operation of the plant.

A plant designed in this manner is independently stable and can be regulated like any other gas turbine plant, for example by varying the upper temperature of the process. Whether operating at full load, partial load or no load, the process-limiting pressures, which vary in accordance with the operating conditions, will have no effect on the mean pressure of the working gas. The mean pressure of the working gas is also the mean pressure within the reactor. If a return line from the high-pressure pipe to the intake manifold of the compressor is provided, the nuclear reactor of such a plant will therefore never be endangered, even in case of a load cut-off or a rapid circuit-breaking. The use of a pipe line by-passing both the high-pressure section of the gas turbine and the reactor will improved the static as well as the dynamic behavior of the plant under partial load.

BRIEF DESCRIPTION OF THE DRAWING

A power plant according to the present invention is schematically illustrated in the single accompanying drawing.

DETAILED DESCRIPTION OF THE PRESENT INVENTION

With reference to the single drawing, a power plant according to the present invention includes a compressor having a low pressure section 1. The low-pressure section 1 of the compressor receives recooled working gas at a point of lowest pressure in a circulating system for the working gas. The section 1 compresses the working gas to an intermediate pressure. After being cooled in an intercooler 2 which is connected to a pipe-line 3, the working gas is further compressed in a high-pressure section 4 of the compressor to a maximum pressure of the circulating system. The working gas then flows through a high-pressure pipe line 5 to a heat exchanger 6 where the gas is heated. From there the working gas flows to a high-pressure section 7 of a gas turbine where the gas will expand in conformity with the specific arrangement so that the high pressure section 7 will sufficiently drive the low-pressure section of the compressor. A starting motor 15 is located on the same shaft which includes the turbine section 7 and the compressor section 1. The starting motor can be disengaged from the shaft.

The working gas, which is cooled off by a partial expansion within the high-pressure section of the gas turbine, is conducted by way of a line 8 to a nuclear reactor 9. The working gas serves as a coolant and is heated within the reactor to the highest temperature existing within the circulation system. The gas continues its flow into a low pressure section 10 of the gas turbine where a further expansion of the working gas occurs. The low pressure section 10 drives both the high-pressure section 4 of the compressor and a current generator 11, all of which are located at a single shaft 16.

The expanded gas, which is at a temperature level that is still relatively high, travels from the low-pressure section 10 of the gas turbine by way of the exhaust pipe 12 to the heat exchanger 6. While within the heat exchanger 6, the gas in pipe 12 heats the working gas flowing toward the high-pressure section 7 of the gas turbine. From the heat exchanger 6, the gas is carried by way of an intake pipe 13 and a pre-cooler 14 to the low-pressure section 1 of the compressor. In this way, the working gas completes the normal circulation path for the working gas of the present invention.

A return line 17 branches off from the high-pressure pipe line 5 in front of the heat exchanger 6 and enters the intake pipe 13 in front of the pre-cooler 14. The flow through the return line 17 is controlled by a throttle valve 18. The valve 18 is controlled through a control line 19 by a speed governor 20 which is located on the shaft 16. The return line 17 could in principle enter the intake pipe 13 upstream of the heat exchanger 6 but it is more advantageous to cool the recirculated working gas in the pre-cooler 14 prior to entry of the gas into the low-pressure section 1 of the compressor.

From the high-pressure pipe line 5 a return line 21 branches off upstream of the heat exchanger 6 and enters the exhaust pipe 12 downstream of the low-pressure section 10 of the gas turbine. The flow through the return line 21 is controlled by the throttle valve 22 which is influenced through a control line 23 by the speed governor 20.

A by-pass line 24 branches off from the high-pressure pipe line 5 downstream of the heat exchanger 6 and enters the connecting line 8 between the reactor 9 and the low-pressure section 10 of the gas turbine. The flow through the by-pass line 24 is controlled by a by-pass valve 25 which is controlled through a control line 26 by the output valve of the current generator 11.

In accordance with the present invention, the power plant has a suitable structural configuration and a suitable proportioning of the components and pipe lines through which the working gas is flowing. In this way, the volume of the components are filled with working gas in such a manner that, during operation, the mean working gas pressure within the reactor 9 conforms to the compensating pressure of the warm working gas within the circulating system after a shut-down of the power plant (following operation). An apportionment of the pressure gradient for the two turbine sections 7 and 10 is thereby established. From these values, an apportionment of the gradients for the two compressor sections 1 and 4 is also thereby derived.

It will be expedient, accordingly, to balance the turbo-group including the compressor section 1 and the turbine section 7 with respect to performance. This means that the turbo-group neither requires any external energy supply nor delivers any surplus power to the outside. In this way, it becomes possible to design the turbo group in an optimum manner and without limiting the turbo-group to a constant speed.

The starting motor 15 serves only as an aid during a starting of the power plant and is typically disconnected during operations. However, it is also possible to design the power plant in such manner that a variable-voltage motor-generator of low losses is provided in place of the starting motor. The motor-generator must however, be able to receive a positive or negative net output of the turbine section 7 and compressor section 1.

It is also possible, however, to start the power plant with the aid of the current generator 11 operating as a motor since the generator would drive the high-pressure section 4 of the compressor which supplies the working gas to the high-pressure section 7 of the gas turbine. In such an arrangement with a turbo-group which is balanced according to output during normal operations, a motor-generator (in place of the starting motor 15), having a speed which is variable with low losses, can be very useful. Such a use of the motor generator would enable one to extend the range of capacity of the power plant, especially at the lower end, beyond the limits set by the by-pass valve 25 of the by-pass line 24, while still maintaining a high degree of efficiency.

When determining the structural configuration of the components and pipe lines, especially concerning the gas-filled volume of the components and pipe lines, it will be advantageous to ensure that the compensating pressure of the circulating warm gases is closer to the upper rather than the lower extreme pressure of the process. This measure will result in a greater expansion gradient of the working gas within the low-pressure section of the gas turbine which (in addition to driving the high-pressure section of the compressor) is responsible for the production of the useful power of the power plant. Such a measure will considerably lower the temperature level of the heat exchanger 6 with the result that no problems will arise which would require the use of special materials for the heat exchanger 6.

The quantity of heat to be transferred by the heat exchanger 6 will also be greatly reduced by this measure and the balance with respect to performance of the turbo-group including the compressor section 1 and the turbine section 7 is likewise possible.

The relatively low temperature of the working gas at the intake of the high-pressure section 7 of the gas turbine will permit a simple turbine design without requiring a cooling of the blades. The unnecessary cooling as well as the equalization of the high pressure section of the turbine with the low-pressure section of the compressor, which makes a motor-generator unnecessary, are the proper prerequisites for dividing the power plant into several high-speed turbo groups. The turbo-groups can match in number the number of heat exchangers 6, which are then connected in parallel. Alternatively, the turbo-groups can be multiples of such number. Such turbo-groups can be incorporated relatively easily within a concrete pressure vessel.

The throttle valves 18, 22 and the by-pass valve 25 serve as power plant regulators. The large valves 18 and 22, which control a relatively cold gas, open in the event of a load cut-off or a rapid circuit breaking while the smaller valve 25 controls working gas of average temperature and is used for the control of varying loads.

In the case of a load cutoff of the current generator 11, the speed governor 20 will open the throttle valves 18 and 22, causing the working gas to flow from the high-pressure portion of the circulating system to the low-pressure portion of the circulation system thereby resulting in a rapid accumulation of the working gas at the low-pressure side of the circulating system. The accumulation is followed by a similarly rapid drop in the output of the low-pressure section 10 of the gas turbine. The pressure downstream of the high-pressure section 7 of the gas turbine will also drop. At idling speed, the heavy load of the high-pressure section 10 of the compressor is still present so that the maximum working gas pressure in the low-pressure section 10 of the gas turbine needs to be reduced only by approximately one half.

Accordingly, since the pressure within the reactor is effectively constant, the two extreme pressures of the circulating system will approach one another as the bypass flow increases until the no-load pressure ratio has been reached. If the temperature of the working gas immediately downstream of the nuclear reactor is kept at a constant value, the temperatures downstream of the low-pressure section 10 of the gas turbine, that is within the heat exchanger 6 and upstream of the high-pressure section 7 of the gas turbine, would necessarily increase, (if only the throttle valve 18 in the return line 17 opens). Such an undesirable temperature increase can be suppressed if the throttle valve 22 in the return line 21 opens simultaneously with the throttle valve 18. Since the return line 21 enters the exhaust pipe 12 of the low-pressure section 10 of the gas turbine upstream of the heat exchanger 6, the supply of cooler working gas will reduce the temperature downstream of the turbine section 10.

The proper behavior of the turbo-group, including the compressor section 1 and the turbine section 7 under partial load upon removal of the load of the current generator 11, is important since the speed of the turbo-group will not decrease by more than 15% to 20% as a result of the opening of the throttle valves 18, 22.

It is also possible, however, to utilize the two return lines 17 and 21 with the associated throttle valves 18 and 22 for control during partial loads. For example valve 18 may open by itself if the load is above 40% and valve 22 may also open in addition to valve 18 only when the load drops below this value.

The control method, which is described above and that is particularly advantageous in the case of rapid load cutoff, has a low degree of efficiency under partial load but offers the significant advantage that in the case of a load cutoff of the current generator the thermal output of the reactor need not be reduced very much.

In the case of a planned operation under partial load, a control of the power plant with the aid of the by-pass line 24, or with the by-pass valve 25 respectively, will be more advantageous. The partial by-passing both of the high-pressure section 7 of the gas turbine and of the reactor 9 will successively lower the pressure in front of the high-pressure section of the turbine so that the turbine will undergo a power shortage and consequently a drop in r.p.m. The bypass will also automatically reduce the speed of the low-pressure section 1 of the compressor which rotates on the same shaft, with the result that due to a lowering of its pressure ratio, the induction pressure of the low pressure section 1 and thus the backpressure of the turbine section 10 increases. The utilization of the by-pass line 24 further makes it feasible to maintain the temperature downstream of the reactor at a constant value for all practical purposes. A high degree of efficiency under a partial load will thus be attained since even a by-pass of a small amount of material will cause a considerable change in the performing balance of the turbo-group and because the energy contained in the material flowing through the by-pass line is partially recovered in the low-pressure section of the gas turbine.

The invention which is intended to be protected herein has been described by way of a preferred embodiment and is not to be construed as limited to the particular forms disclosed, since these are intended to be regarded as illustrative rather than restrictive. Variations and changes may be made by those skilled in the art without departing from the spirit of the present invention.

What is claimed is:

1. A power plant, comprising:
   compressor means for compressing a working fluid, the compressor means having a relatively high pressure compressor section and a relatively low pressure compressor section;
   turbine means for expanding the working fluid, the turbine means having a relatively high pressure turbine section and a relatively low pressure turbine section;
   heating means for supplying heat to the working fluid;
   circulation means for supplying the working fluid in a closed path among the compressor means, the turbine means and the heating means, the circulation means supplying the working fluid from the high pressure section of the turbine means to the heating means and then to the low-pressure section of the turbine means;
   first shaft means for operatively connecting together the high pressure compressor section and the low pressure turbine section;
   second shaft means for cooperatively connecting together the low pressure compressor section and the high pressure turbine section; and
   control means for maintaining the pressure of the working gas substantially constant between the high and low pressure turbine sections and within the heating means.

2. The power plant of claim 1, wherein the heating means is a gas-cooled nuclear reactor, the working fluid being a gas.

3. The power plant of claim 1, further comprising:
   heat exchange means for transferring heat from the working fluid flowing between the low pressure turbine section and the low pressure compressor section to the working fluid flowing between the high pressure compressor section and the high pressure turbine section.

4. The power plant of claim 1, wherein:
   the control means includes a return line providing selective communication between the working fluid immediately downstream of the high pressure compressor section and the working fluid immediately upstream of the low pressure compressor section, the communication being controlled in response to a speed of the first shaft means.

5. The power plant of claim 1, wherein the control means includes a return line providing selective communication between the working fluid immediately downstream of the high pressure compressor section and the working fluid immediately downstream of the low pressure turbine section, the communication being controlled in response to a speed of the first shaft means.

6. The power plant of claim 1, wherein:
   the control means includes a by-pass line providing selective communication between the working fluid immediately upstream of the high pressure turbine section and the working fluid immediately upstream of the low pressure turbine section, the communication being controlled in response to a power output of the first shaft means.

7. A power plant, comprising:
   a compressor having a high pressure compressor section and a low pressure compressor section;
   a turbine having a high pressure turbine section and a low pressure turbine section;
   nuclear reactor means for supplying heat to a working fluid of the compressor and turbine;
   circulation means for supplying the working fluid in a closed path among the compressor sections, the turbine sections and the nuclear reactor means, the circulation means supplying the working fluid from the high pressure turbine section to the low pressure turbine section;

a first shaft, the high pressure compressor section and the low pressure turbine section being operatively connected by the first shaft;

a second shaft, the low pressure compressor section and the high pressure turbine section being operatively connected by the second shaft; and control means for maintaining the pressure of the working gas substantially constant between the high and low pressure turbine sections and within the nuclear reactor means.

8. The power plant of claim 7, further comprising:
a current generator operatively connected to the first shaft and driven by the low pressure turbine section.

9. The power plant of claim 7, further comprising:
a heat exchanger, working fluid from the high pressure compressor section flowing through the heat exchanger to the high pressure turbine section and working fluid from the low pressure turbine section flowing through the heat exchanger to the low pressure compressor section.

10. The power plant of claim 9, wherein:
the control means includes a first return line for the working fluid, the first return line selectively communicating the working fluid immediately downstream of the high pressure compressor section with the working fluid immediately downstream of the low pressure turbine section, the communication being controlled in response to a speed of the first shaft.

11. The power plant of claim 9, wherein:
the control means includes a second return line for the working fluid, the second return line selectively communicating the working fluid immediately downstream of the high pressure compressor section and the working fluid immediately downstream of the low pressure turbine section, the communication being controlled in response to a speed of the first shaft.

12. The power plant of claim 9, wherein
the control means includes a by pass line providing selective communication between the working fluid immediately upstream of the high pressure turbine section and the working fluid immediately upstream of the low pressure turbine section, the communication being controlled in response to a power output of the first shaft.

13. A method for operating a power plant, comprising the steps of:
supplying working fluid in a closed circular system in a path from a low pressure section of a compressor to a high pressure section of the compressor, to a low pressure section of a turbine, to a high pressure section of the turbine, and back to the low pressure section of the compressor;

driving the low pressure section of the compressor with the high pressure section of the turbine through a first shaft;

driving the high pressure section of the compressor with the high pressure turbine section through a second shaft;

heating the working fluid flowing between the high pressure turbine section and the low pressure turbine section in a nuclear reactor; and maintaining a substantially constant pressure of the working fluid both between the high and low sections of the turbine and in the nuclear reactor.

14. The method of claim 13, wherein
the pressure is maintained substantially constant by selectively communicating the working fluid immediately downstream of the high pressure compressor section with the working fluid immediately upstream of the low pressure compressor section in response to a speed of the first shaft;

15. The method of claim 13, wherein
the pressure is maintained substantially constant by selectively communicating the working fluid immediately downstream of the high pressure compressor section with the working fluid immediately downstream of the low pressure turbine section in response to a speed of the first shaft.

16. The method of claim 13, wherein
the pressure is maintained substantially constant by selectively communicating the working fluid immediately upstream of the high pressure turbine section with the working fluid immediately upstream of the low pressure section in response to a power output of the first shaft.

17. The method of claim 13, further comprising the step of
exchanging the heat in a heat exchanger between working fluid flowing between the low pressure turbine section and the low pressure compressor section with working fluid flowing between the high pressure compressor section and the high pressure turbine section.

18. The method of claim 17, wherein
the pressure is maintained substantially constant by selectively communicating the working fluid immediately downstream of the high pressure compressor section and upstream of the heat exchanger only with working fluid immediately downstream of the heat exchanger and upstream of the low compressor section when a load of the power plant is above a predetermined value and by additionally selectively communicating the working fluid with working fluid immediately upstream of the heat exchanger and downstream of the low pressure turbine section when the load of the power plant is below a predetermined value.

* * * * *